United States Patent Office 2,924,522
Patented Feb. 9, 1960

2,924,522

FEED BLOCKS

Albert J. Gehrt, Marion J. Caldwell, and Wallace P. Elmslie, Quincy, Ill., assignors to Moorman Manufacturing Company, Quincy, Ill., a corporation of Illinois No Drawing. Application May 15, 1957
Serial No. 659,229

16 Claims. (Cl. 99—2)

The present invention relates to feed blocks for animals and relates particularly to improvements and innovations in the binders or binding agents used for protein feed blocks.

Salt blocks for animals have been well known for many years and are produced from salt alone by subjecting it to high pressure in suitable machines. No binder is required in view of the ability of the salt to be formed into a hard block under the pressures used. In recent years mineral feed blocks have been available for the purpose of supplying mineral supplements to animals.

For a number of years protein feeds have been formed into small cubes or pellets for range feeding, such pellets or cubes ranging up to as much as three-quarters of an inch in diameter to two inches long for the larger sizes. Such cubes or pellets have been made with the use of molasses and/or condensed distillers solubles as the binders.

As distinguished from pellets or cubes which are relatively small in size, blocks are usually much larger, e.g. 9" x 9" x 12". As a form of animal feed, blocks offer the following and other advantages over other forms such as granular pellets or cubes:

(1) Labor saving in that feed blocks will last several days and thereby daily or every-other day feeding is eliminated.

(2) Each animal may get its share and timid or small animals will have an opportunity to eat after more aggressive animals have finished or tired of eating.

(3) Less bulk and easier to handle, store and feed.

(4) Savings in feed since no feed blows away or is trampled into the ground.

(5) Can be fed outdoors without cover except during periods of unusually heavy rainfall and high humidity.

Protein feed blocks, as distinguished from feed in the form of cubes or pellets, have been on the market only recently and not on a large scale. Such protein feed blocks were made with molasses or molasses-type materials as the binders, but such binders have not proved completely satisfactory for this purpose, particularly in failing to provide sufficient resistance to weathering or rain, and to breakage or impact. The protein feed blocks are naturally substantially softer or less dense than mineral feed blocks and are much more subject to rain damage and breakage.

It has been found in accordance with the present invention that certain vegetable protein materials which have been treated with alkali serve very satisfactorily as binders for protein feed blocks, either when used alone or in admixture with small amounts of molasses or molasses-like materials. Not all vegetable proteins are useful as binders in the present invention, it having been found that certain members of that class art not useful for that purpose. Those vegetable protein materials which have been found useful are the substantially mucin-free, vegetable protein materials. Specifically, peanut meal, corn gluten meal, soybean oil meal or soybean flour, cottonseed meal, and dried distillers solubles have been found to be useful members of this class. Linseed oil meal is an example of a vegetable protein which has a substantial mucin content and which does not serve satisfactorily as a binder for protein feed blocks in accordance with this invention. Starch and starchy materials have not shown satisfactory binding properties.

The object of the invention, generally stated, is the provision of improved protein feed blocks for animals, particularly ruminants, which have or exhibit the following desirable characteristics or properties:

(1) Improved weather resistance, i.e. ability to withstand dampness and precipitation, including resins, when placed on the ground in the open, without disintegrating or becoming unduly soft.

(2) While having sufficient moisture resistance so as to be adequately weather-resistant, not being so moisture-proof or hard that the blocks cannot be consumed by the animals with the ease and at the rates desired.

(3) Having excellent resistance to fracture on impact or dropping.

(4) Having an inexpensive, nutritious binder that lends itself to formulating feed blocks with the desired degree of weather resistance, palatability and consumability while contributing to the protein content.

(5) Being made with binder materials which, on a dry weight basis, are substantially more efficient than molasses binders—that is, the molasses may be replaced with as little as one-third of its weight of the vegetable protein binders.

(6) Freedom from unattractive or unpleasant taste or odor while permitting the palatability or consumability to be controlled within desired limits.

(7) Ease of manufacture in commercial machinery with a high degree of uniformity and low percentage of rejects or imperfect blocks.

Another object of the invention is the use as all or the major portion of the binder content of protein feed blocks of alkali-treated vegetable protein binders which have little or no mucin content, and which includes such materials as peanut meal, corn gluten meal, soybean oil meal, soybean flour, cottonseed meal, and dried distillers solubles.

Another object of the invention is the usage of a portion of the vegetable protein content of protein feed blocks as binder for the blocks.

While the invention is primarily directed to protein feed blocks, it is also useful in connection with pellets or cubes, and the foregoing objects are applicable thereto.

Certain other objects of the invention will, in part, be obvious and will, in part, appear hereinafter.

For a more complete understanding of the nature and scope of the invention, reference may now be had to the following detailed description thereof wherein certain illustrative examples will be set forth to serve as the presently preferred embodiments of the invention.

The protein feed blocks of this invention are designed and used for so-called "free choice" feeding. That is, the blocks are suitably placed in the open, on the range, pasture or feed lot where they can be easily reached by the animals as they feed. Usually, they will be placed directly on the ground. Such feed blocks may, for example, weigh from about 30–40 pounds each and measure about 9" x 9" x 12", being generally square or rectangular in cross section. It will be understood, of course, that the feed blocks may vary considerably with respect to weight, shape and size.

Usually the feed blocks are put out in sufficient number, depending upon the number of animals and feeding conditions involved, so that they will provide the animals up to several days or even weeks of feeding. The feed blocks are so designed and formulated that they will supplement the natural foodstuff or forage available to the animals through grazing. Grazing conditions will vary widely, depending upon such factors as season, geographical location, rainfall, etc. It will be understood that grazing conditions can therefore vary from the best or ideal, in which there is ample forage readily available to the animals, to poor in which the amount of forage is inadequate and of inferior quality. In the first case, it is only necessary to supplement the natural feed so as to supply protein, minerals, vitamins and other nutritional factors which may not be present, or not present to a sufficient degree, in the natural forage. In the second case where the natural forage available is sparse and of poor quality, a substantial portion of the ration must be obtained from other sources, such as the protein feed blocks of the present invention plus enough hay or other roughage to satisfy the energy needs of the animals.

Generally stated, the purpose of protein feed blocks is to provide the animals with a balanced ration by supplementing the variety and amount of foodstuff or forage available naturally through grazing. The palatability of the feed blocks is a factor which may be varied and used to control the rate of consumption. For example, when pasture or range conditions are excellent, the feed blocks should have high palatability to attract the animals so that they will obtain the necessary content of protein, minerals and vitamins in their ration since, under these conditions, the animals tend to fill up on the readily accessible natural forage alone. On the other hand, if pasture or range conditions are poor, then the palatability of the feed blocks should be reduced since the animals will tend to feed exclusively on the feed blocks and not exert themselves to eat such natural forage as is available.

The main difficulty encountered in producing protein feed blocks which incorporate or exhibit to an adequate degree all of the necessary and desirable properties above mentioned, was finding a satisfactory binder. Molasses is a common ingredient in animal feeds and has binding properties. Since molasses has also been used successfully as the binder for small feed pellets and cubes, it was initially used as the binder for protein feed blocks. However, it was found to be unsatisfactory for such use primarily because feed blocks made with molasses as the binder were not sufficiently weatherproof or resistant to high humidities, and did not have adequate resistance to impacts and breakage. Thus, when feed blocks manufactured with molasses as the binding agent are exposed to rain, the exterior rapidly softens and the block is progressively washed away, the rate depending upon the length and severity of the rain. Under high humidity conditions the blocks also soften up and take on a condition where they may be consumed more rapidly than intended. Furthermore, when molasses is used as the binder, because of its sweetness it may make feed blocks more palatable than desired, so that even when not exposed to high humidities or to rain, the saliva from the animal's mouth brings about excessive softening of the blocks, sometimes at a rate and with a degree of ease greater than that desired. Feed blocks must be able to withstand considerable impact incidental to normal handling. For example, they will usually be re-handled several times after manufacture and ultimately may be kicked off the platform of a wagon or truck onto the ground.

It was discovered according to the present invention that vegetable protein materials of the class mentioned above (e.g. peanut meal, corn gluten meal or soybean flour) could be used very satisfactorily as the basic ingredient of the binder for protein feed blocks, with or without other binder materials such as molasses, or molasses-like substances. Peanut meal, for example, when suitably alkalized, permits the feed blocks to be formulated with suitable flexibility so as to fulfill all of the desired properties and characteristics. Such binder materials are especially useful in imparting improved water-repellency or weather resistance and good strength or breakage resistance to the blocks. These vegetable protein binders are inexpensive, edible, efficient in small amounts and work well in the machinery used for producing the blocks. As mentioned, the alkalized vegetable protein binders may be used alone or in association with molasses or a similar type sugary material. While inadequate as a binder by itself, molasses is a desirable ingredient in many instances and its limited binding properties can be taken advantage of with some decrease in the amount of the principal binder material used.

Broadly stated, protein feed blocks made according to this invention are formed of a major quantity of protein-rich feedstuffs or ingredients blended, pressed and bonded together with a minor amount of a binder containing alkali-treated or vegetable protein of the class above described as the essential ingredient. A typical feed block of the invention has the following general formula after the blocks have dried to normal moisture content following manufacture:

| | Percent by weight |
|---|---|
| Feedstuffs (protein feeds, minerals and vitamins) | 85–98 |
| Molasses | 0–8 |
| Vegetable protein binder | 1–9 |

The lower proportion of 1% binder may be used when molasses or similar material is present which provides some binding action. As produced the blocks may have a moisture content of from about 10 to 12% and upon curing or drying will lose from about 1 to 1.5% so as to have a cured or dried moisture content of about 9 to 10.5%.

The so-called feedstuffs content in the feed blocks is principally vegetable protein supplement fortified with minerals, and if desired, vitamins or ingredients rich in vitamins. The present invention is not specifically concerned with the details of the feedstuffs mixture or with any particular formulation thereof. Rather, the present invention is applicable generally to any suitable mixture of protein-rich feedstuffs that may be selected or considered useful for protein feed blocks.

The present invention is particularly concerned with the binder portion of the feed blocks and is based on the discovery that when certain alkali-treated vegetable proteins constitute the sole or basic ingredient of the binder, improved feed blocks having the above mentioned desirable properties can be made. The mucin-free vegetable proteins which are useful include: peanut meal, corn gluten meal, soybean flour (preferably the untoasted variety), soybean oil meal, cottonseed meal, and dried distillers solubles. In manufacture, an aqueous slurry of peanut meal, for example, is treated with alkaline materials such as caustic soda and hydrated lime in order to develop its binding properties. Advantageously, the binder is prepared in inexpensive mixing equipment right at the point of manufacture in the plant of the feed blocks. Preferably it is not allowed to stand more than about 24 hours before it is used. For example, peanut meal for use as a binder ingredient in the present invention may be used according to the following formulation:

EXAMPLE 1

| Ingredient | Percent by weight |
|---|---|
| Water | 78.0 |
| Sodium hydroxide | 1.4 |
| Hydrated lime | 0.6 |
| Vegetable protein (peanut meal) | 20.0 |
| | 100.0 |

| Procedure | For 400 lbs. of binder |
| --- | --- |
| Place water in tank | 280 lbs. |
| Add vegetable protein (peanut meal) | 80 lbs. |
| Stir to complete suspension—Then add: sodium hydroxide. | 5.6 lbs in 20 lbs. water. |
| Stir until uniform—Then add and stir: hydrated lime. | 2.4 lbs. in 12 lbs. water. |
| | 400 lbs. |

The foregoing procedure for combining the ingredients of the binder is not essential since the order or method of addition may be varied as desired. For example, the sodium hydroxide and hydrated lime could be added to the water, and thereafter the vegetable protein could be added. Alternately, the sodium hydroxide could be added to part of the water and the hydrated lime added to another part and then the vegetable protein added partly to one alkali mixture and partly to the other, and the two portions combined and stirred. Still another procedure would be to prepare a mixture of both the sodium hydroxide and hydrated lime in water and then add this single alkali mixture to the stirred suspension of the vegetable protein.

The binder prepared in accordance with Example 1 may be used alone as the sole binder ingredient for a protein feed block, or molasses or a molasses-like material may be used as part of the formulation, primarily for its flavor-improving properties, but with advantage being taken of its inadequate binding characteristics.

EXAMPLE 2

Parts by weight as mixed
Peanut meal binder (Example 1) _____ 4
Blackstrap molasses _____ 4

EXAMPLE 3

Peanut meal binder (Example 1) _____ 6
Blackstrap molasses _____ 2

EXAMPLE 4

Peanut meal binder (Example 1) _____ 4
Blackstrap molasses _____ 2

EXAMPLE 5

Peanut meal binder (Example 1) _____ 2
Blackstrap molasses _____ 4

It will be understood that certain substitutions and variations may be made with respect to the formulations of Examples 1–5. Thus, the hydrated lime is desirable because it produces a gel which increases or improves the water repellency of the feed blocks. However, it is possible to eliminate the hydrated lime or reduce the portion of it which is used. The sodium hydroxide may be replaced all or in part with potassium hydroxide. The peanut meal may be replaced all or in part with one or a mixture of other vegetable protein materials of the class useful for this invention, e.g. corn gluten meal, soy flour, soybean oil meal, cottonseed meal, and dried distillers solubles. The blackstrap molasses in Examples 2–5 may be replaced all or in part with other molasses-like materials including condensed distillers molasses solubles, corn sugar molasses, and hydrol.

The following example will serve to illustrate a presently preferred embodiment of the invention:

EXAMPLE 6

Percent by weight [1]
Feedstuffs _____ 88–94
Blackstrap molasses _____ 0– 4
Vegetable protein binder (as per Example 1) ____ 6– 9

[1] As formulated before curing or drying.

The molasses was mixed into the vegetable protein binder portion prepared according to Example 1 and then this mixture was thoroughly blended with the feedstuffs and the resultant blend compressed into protein feed blocks weighing approximately 35 pounds each and measuring 9" x 9" x 12". The feedstuffs used had the following formulation:

| Ingredient | Percent by weight |
| --- | --- |
| Protein meals (including soybean, cottonseed, linseed, peanut, wheat germ and corn gluten) | 75–85 |
| Urea (feed grade) | 3–5 |
| Minerals | 10–20 |

After the feed blocks have been produced from the foregoing materials as described, they are permitted to dry or cure before shipment or use. These blocks will dry either on standing or, if desired, they may be rapidly dried in a curing room.

In order to evaluate protein feed blocks made in accordance with the present invention both from the standpoint of suitability for actual use and for improvement over feed blocks produced with molasses or molasses-like material as the binder, the feed blocks have been subjected to standardized tests for accurately measuring resistance to impact or breakage and for weatherproofing or moisture resistance. The procedures for such tests (i.e. impact and sprinkling) are as follows:

Impact test

The feed blocks are dropped from a support eight feet above a concrete floor. Each block is placed on the support in an identical position and then tipped off in the same way each time so that the results will be authentic and reproducible. While different specific procedures can be used, the one that has been standardized on is to place the feed block on its side on the support so that the block is resting on one of its four vertical side faces (as produced in the molding machine) but with the top end of the block (as produced in the molding machine) extending over the edge of the support. The block is positioned in this manner and allowed to project over the support just sufficiently so that it is practically balanced on the edge and upon being released will rotate over the edge and fall down onto the floor. This procedure is so reliable that on each drop the blocks will fall on their bottom edge as they strike the floor having rotated to that extent during the course of the fall. Each block is repeatedly dropped in this same manner until they either crack or break. If not broken or cracked on ten drops no further drops are made.

Sprinkling test (1) A feed block under test is placed on a hard well-drained surface and is exposed to water from a sprinkler. The simulated rain is permitted to fall on the block until one inch of water collects in a rain gauge placed alongside the block. Each block is turned so that one side (the so-called "front") directly faces the sprinkler.

(2) The block is allowed to stand four hours and then is subjected to another simulated one inch of rainfall.

(3) The block is then allowed to stand for one hour.

(4) The four vertical sides of the block are then scraped so as to remove the softened material on the surface.

(5) After scraping, the remaining hard core of the block is calipered between the sides and from front to back. The differences between the original measurements and the measurements of the hard core are divided by two and the resultant values are referred to as surface penetration values. It will be appreciated that the lower the penetration values obtained in the above test, the more water resistant or weatherproof a block is.

The following table compares protein feed blocks made with molasses type binder (i.e. the control) and alkalized vegetable protein binders with respect to the impact test and the sprinkling test. The feed blocks (four for each different binder) were all formulated and produced in accordance with Example 6 above except that the molasses and vegetable binder components of Example 6 were replaced with the binder materials as indicated in the table. The second set of blocks (75% vegetable protein binder—25% blackstrap molasses binder) were produced completely according to Example 6.

TABLE 1

| Binder | Impact[a] Test | Sprinkling Test, 2″ Rain | | |
|---|---|---|---|---|
| | | Sides[b] | F-B[c] | Surf.[d] Pen. |
| | | Inches | Inches | Inches |
| 50% Blackstrap molasses—50% condensed distillers molasses solubles | 2 | 7/32 | 7/32 | 11/32 |
| Peanut meal | 9.5 | 6/32 | 5/32 | 19/32 |
| Corn gluten meal | 8 | 9/32 | 6/32 | 22/32 |
| Soybean flour | 5.75 | 9/32 | 9/32 | 24/32 |
| 75% Soybean flour—25% blackstrap molasses | 4.25 | 9/32 | 9/32 | 20/32 |
| Cottonseed meal | 3.25 | 7/32 | 9/32 | 20/32 |
| Dried distillers solubles | 4.25 | 6/32 | 9/32 | 24/32 |

[a] Average of four individual tests. Each block balanced on flat side on 8′ support with top face projecting—always struck concrete floor on the bottom edge.
[b] Penetration measured by scraping soft material and calipering hard core.

$$\text{Penetration} = \frac{\text{orig. width} - \text{width hard core}}{2}$$

[c] Front-to-back softening measured by scraping soft material and calipering hard core.

$$\text{Penetration} = \frac{\text{orig. thickness} - \text{thick hard core}}{2}$$

[d] Penetration of the top surface.

It will be understood, as indicated above, that within practical limits, there is no critical size for the feed blocks produced according to this invention, and that instead of being compressed into the relatively large-size blocks as indicated the blended formulations could be formed into the smaller pellets or cubes.

While the vegetable protein binders prepared in accordance with the invention are primarily used in protein feed blocks as described and illustrated, they may be used in mineral feed blocks or feed blocks made from other known feedstuffs such as ground grains, grain by-products, ground alfalfa, etc. While the relatively low levels of vegetable protein binder given in the foregoing examples are adequate for the types of feeds mentioned therein, substantially higher levels may be required if absorbent, porous or fibrous ingredients such as ground oats, wheat bran, alfalfa meal, beet pulp, citrus pulp, etc. comprise any considerable part of a feed formula.

It will be understood that the foregoing disclosure is intended to be interpreted as illustrative and not in a limiting sense.

What is claimed as new is:

1. Compressed animal feed comprising feedstuffs bonded by a binder an essential component of which is alkali-treated substantially mucin-free vegetable protein feedstuff.

2. An animal feed block comprising feedstuffs bonded by a binder consisting essentially of alkali-treated substantially mucin-free vegetable protein feedstuff and a molasses-like substance.

3. Compressed protein feed comprising protein-rich feedstuffs bonded by a binder an essential component of which is alkali-treated substantially mucin-free vegetable protein feedstuff.

4. Compressed protein feed comprising protein-rich feedstuffs bonded by a binder an essential ingredient of which is an alkali-treated vegetable protein feedstuff selected from the group consisting of peanut meal, corn gluten meal, soybean flour, soybean oil meal, cottonseed meal, and dried distillers solubles.

5. Compressed protein feed comprising as a major component protein-rich feedstuffs and as minor components from zero up to a minor amount of molasses-like substance and a minor amount of an alkali-treated substantially mucin-free vegetable protein feedstuff, said alkali-treated vegetable protein feedstuff and any molasses-like material that is present serving as the binder for the other ingredients.

6. Compressed protein feed comprising as a major component protein-rich feedstuffs and as minor components from zero up to a minor amount of molasses-like substance and a minor amount of an alkali-treated vegetable protein feedstuff selected from the group consisting of peanut meal, corn gluten meal, soybean flour, soybean oil meal, cottonseed meal, and dried distillers solubles, said alkali-treated vegetable protein feedstuff and any molasses-like material that is present serving as the binder for the other ingredients.

7. Protein feed block characterized by good impact resistance and weather resistance having the following composition when cured or dried:

| | Percent by weight |
|---|---|
| Feedstuffs | 85–98 |
| Molasses-like substance | 0–8 |
| Binder | 1–9 | said feedstuffs consisting predominantly of protein-rich feedstuffs, and said binder consisting primarily of alkali-treated substantially mucin-free vegetable protein feedstuff.

8. The protein feed block of claim 7 wherein said vegetable protein feedstuff comprising said binder is treated in aqueous suspension with approximately 10% by weight of alkali.

9. The protein feed block of claim 7 wherein said vegetable protein feedstuff component of said binder is treated in aqueous suspension with approximately 10% by weight of at least one alkali selected from the group consisting of sodium hydroxide, potassium hydroxide, a mixture of a major proportion of sodium hydroxide and a minor proportion of hydrated lime, and a mixture of a major proportion of potassium hydroxide and a minor proportion of hydrated lime.

10. The protein feed block of claim 7 wherein said vegetable protein feedstuff component of said binder is treated in aqueous suspension with approximately 7% by weight of sodium hydroxide and approximately 3% by weight of hydrated lime.

11. Protein feed block characterized by good impact resistance and weather resistance having the following composition when cured or dried:

| | Percent by weight |
|---|---|
| Feedstuffs | 85–98 |
| Molasses-like substance | 0–8 |
| Binder | 1–9 | said feedstuffs consisting predominantly of protein-rich feedstuffs, and said binder consisting primarily of alkali-treated vegetable protein feedstuff selected from the group consisting of peanut meal, corn gluten meal, soybean oil meal, soybean flour, cottonseed meal, and dried distillers solubles.

12. Protein feed block comprising approximately 85 to 98% by weight of protein-rich feedstuffs, approximately 0 to 8% by weight of molasses-like substance, and approximately 1 to 9% by weight of alkali-treated peanut meal.

13. The protein feed block of claim 12 wherein the peanut meal is treated in aqueous slurry with about 7% of sodium hydroxide and about 3% of hydrated lime based on the dry weight of the peanut meal.

14. Protein feed block comprising approximately 85 to 98% by weight of protein-rich feedstuffs, approximately 0 to 8% by weight of molasses-like substance, and approximately 1 to 9% by weight of alkali-treated corn gluten meal.

15. The protein feed block of claim 14 wherein the corn gluten meal is treated in aqueous slurry with about 7% of sodium hydroxide and about 3% of hydrated lime based on the dry weight of the corn gluten meal.

16. The method of making a protein feed block which comprises treating an aqueous dispersion of a vegetable protein feedstuff selected from the group consisting of peanut meal, corn gluten meal, soybean flour, soybean oil meal, cottonseed meal, and dried distillers solubles with approximately 10% based on the weight of said protein of alkali, blending the resulting alkali-treated aqueous dispersion with protein-rich feedstuffs and molding the resulting blend into blocks.

References Cited in the file of this patent

UNITED STATES PATENTS

| | | |
|---|---|---|
| 422,370 | Brott | Mar. 4, 1890 |
| 2,554,479 | Wolff | May 22, 1951 |
| 2,560,830 | Turner | July 17, 1951 |